(12) United States Patent
Bååth

(10) Patent No.: US 11,248,899 B2
(45) Date of Patent: Feb. 15, 2022

(54) METHOD AND APPARATUS FOR DERIVING A TOPOGRAPHY OF AN OBJECT SURFACE

(71) Applicant: QSO Interferometer Systems AB, Halmstad (SE)

(72) Inventor: Lars Bååth, Eldsberga (SE)

(73) Assignee: QSO Interferometer Systems AB, Halmstad (SE)

( * ) Notice: Subject to any disclaimer, the term of this patent is extended or adjusted under 35 U.S.C. 154(b) by 774 days.

(21) Appl. No.: 15/753,177

(22) PCT Filed: Aug. 17, 2015

(86) PCT No.: PCT/EP2015/068844
§ 371 (c)(1),
(2) Date: Feb. 16, 2018

(87) PCT Pub. No.: WO2017/028896
PCT Pub. Date: Feb. 23, 2017

(65) Prior Publication Data
US 2018/0238676 A1 Aug. 23, 2018

(51) Int. Cl.
*G01B 9/02* (2006.01)
*G01B 11/24* (2006.01)
(Continued)

(52) U.S. Cl.
CPC ...... *G01B 9/02011* (2013.01); *G01B 9/02005* (2013.01); *G01B 9/02007* (2013.01);
(Continued)

(58) Field of Classification Search
None
See application file for complete search history.

(56) References Cited

U.S. PATENT DOCUMENTS

| 5,488,477 | A | * | 1/1996 | de Groot | G01B 9/02057 |
| | | | | | 356/514 |
| 6,028,670 | A | * | 2/2000 | Deck | G01B 11/2441 |
| | | | | | 356/497 |

(Continued)

FOREIGN PATENT DOCUMENTS

| CN | 101111739 A | 1/2008 |
| CN | 101755187 A | 6/2010 |

(Continued)

OTHER PUBLICATIONS

Joughin, Ian, et al. "Measurement of ice-sheet topography using satellite-radar interferometry." Journal of Glaciology 42.140 (1996): 10-22. (Year: 1996).*

(Continued)

*Primary Examiner* — Rufus L Phillips
(74) *Attorney, Agent, or Firm* — Renner, Otto, Boisselle & Sklar, LLP

(57) ABSTRACT

The embodiments herein relate to a method for deriving topography of an object surface. A linearly polarized light wave is directed towards the object surface and a reference surface. Images of reflected linearly polarized light wave for a plurality of wavelengths are obtained. The images are obtained for at least four polarizations for each of the plurality of wavelengths. The reflected linearly polarized light wave is a reflection of the linearly polarized light wave directed towards the object surface and the reference surface. The topography of the object surface based on the obtained images is obtained.

20 Claims, 7 Drawing Sheets

(51) Int. Cl.
*G06T 7/564* (2017.01)
*G06T 7/521* (2017.01)
*G06T 7/60* (2017.01)

(52) U.S. Cl.
CPC ..... *G01B 9/02057* (2013.01); *G01B 9/02078* (2013.01); *G01B 9/02087* (2013.01); *G01B 11/2441* (2013.01); *G06T 7/521* (2017.01); *G06T 7/564* (2017.01); *G06T 7/60* (2013.01); *G01B 2290/70* (2013.01)

(56) References Cited

U.S. PATENT DOCUMENTS

| | | | | |
|---|---|---|---|---|
| 6,188,484 | B1* | 2/2001 | Lee | G01D 5/38 |
| | | | | 250/237 G |
| 7,023,559 | B1* | 4/2006 | Coulombe | G01B 11/2527 |
| | | | | 356/511 |
| 7,619,746 | B2 | 11/2009 | De Lega | |
| 2002/0003628 | A1 | 1/2002 | James et al. | |
| 2002/0176091 | A1* | 11/2002 | Deck | G01B 11/0608 |
| | | | | 356/512 |
| 2003/0025899 | A1* | 2/2003 | Amara | G01B 11/0625 |
| | | | | 356/73 |
| 2004/0090634 | A1* | 5/2004 | Mathur | G01B 9/02083 |
| | | | | 356/497 |
| 2005/0046865 | A1 | 3/2005 | Brock et al. | |
| 2006/0119861 | A1* | 6/2006 | Saunders | G01B 9/02098 |
| | | | | 356/512 |
| 2006/0215171 | A1* | 9/2006 | Nakata | G01B 9/02003 |
| | | | | 356/487 |
| 2007/0019203 | A1 | 1/2007 | Jansen | |
| 2007/0090189 | A1* | 4/2007 | Suwa | G01B 11/2522 |
| | | | | 235/454 |
| 2009/0012743 | A1* | 1/2009 | McDonnell | G01B 9/02057 |
| | | | | 702/167 |
| 2013/0113925 | A1 | 5/2013 | Kim et al. | |
| 2015/0043006 | A1* | 2/2015 | de Groot | G01B 9/0209 |
| | | | | 356/497 |

FOREIGN PATENT DOCUMENTS

| | | |
|---|---|---|
| JP | 2005189069 A | 7/2005 |
| JP | 2005326249 A | 11/2005 |
| JP | 200724827 A | 2/2007 |
| WO | 2006080923 A1 | 8/2006 |

OTHER PUBLICATIONS

Translation of Nishiyama (JP2005326249A) (Year: 2005).*
Translation of Magai (JP2005189069) (Year: 2005).*
International Search Report for corresponding International Application No. PCT/EP2015/068844 dated Apr. 28, 2016.
Written Opinion of the International Searching Authority for corresponding International Application No. PCT/EP2015/068844 dated Apr. 28, 2016.
Notification of Transmittal of the International Preliminary Report on Patentability for corresponding International Application No. PCT/EP2015/068844 dated Nov. 14, 2017.

* cited by examiner

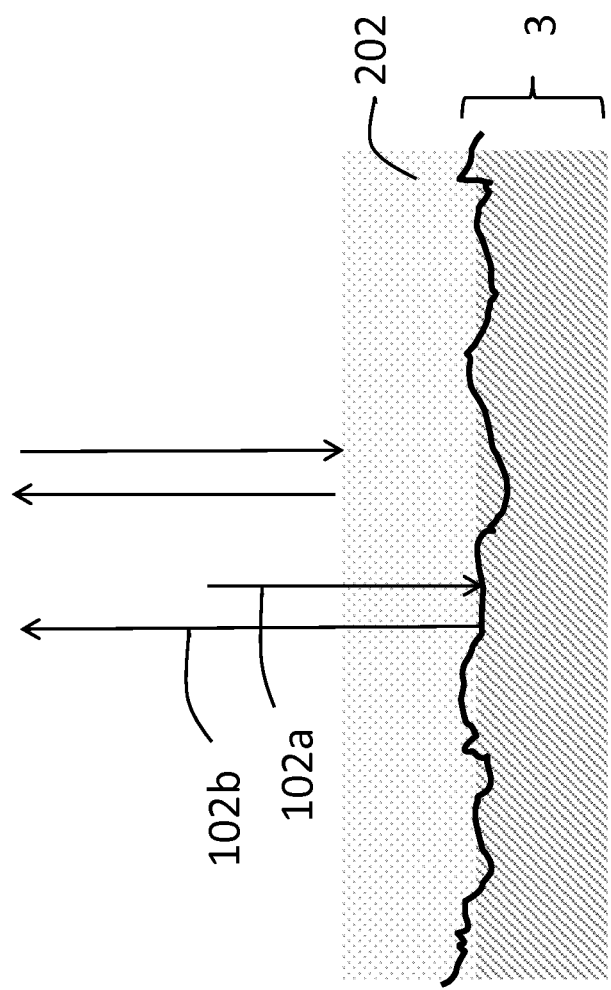

METHOD AND APPARATUS FOR DERIVING A TOPOGRAPHY OF AN OBJECT SURFACE

This application is a national phase of International Application No. PCT/EP2015/068844 filed Aug. 17, 2015, filed in the English language, which is incorporated herein by reference.

TECHNICAL FIELD

Embodiments herein relate generally to a method and a device. More particularly, the embodiments herein relate to a deriving a topography of an object surface.

BACKGROUND

Surface modifications, especially polishing, are a required process in many industrial production areas. These include:
  Automotive, e.g. polishing of molds for plastic parts such as boot lids, light covers and lenses.
  Engine parts such as cam axes.
  Medical implants, e.g. the surface of artificial hip joints.
  Optics such as injection molds for safety glasses and contact lenses.
  Such polished surfaces on different types of objects can be several square meters in size and require a surface accuracy of 1 micrometer or less. In addition, the objects comprising the polished surfaces may be very heavy. Today, the object with the polished surface is moved from the polishing process to a laboratory where the surface is measured at small areas at a time in a time-consuming process. The purpose of polishing the surface is to create a predefined structure, defined by predefined surface parameters, e.g. smoothness, Root Mean Square (RMS) of surface topography, clearness of lines and furrows at predefined depths, peaks at specified heights and sharpness, direction of structures, etc. Such parameters must be reached by the industrial process and is together usually defined as the "quality" of the surface. Furthermore, most of the polishing is done manually, where the manual polisher establishes the quality by looking at the object, whereas the automatic procedure using robot or laser has, in general, to be manually checked by taking the object out of the process chamber.

SUMMARY

An objective of embodiments herein is therefore to obviate at least one of the above disadvantages and to provide improved deriving of the topography of an object surface.

According to a first aspect, the object is achieved by a method for deriving topography of an object surface. A linearly polarized light wave is directed towards the object surface and a reference surface. Images of reflected linearly polarized light wave for a plurality of wavelengths are obtained. The images are obtained for at least four polarizations for each of the plurality of wavelengths. The reflected linearly polarized light wave is a reflection of the linearly polarized light wave directed towards the object surface and the reference surface. The topography of the object surface is derived based on the obtained images.

According to a second aspect, the object is achieved by an apparatus for deriving topography of an object surface. The apparatus is adapted to direct a linearly polarized light wave towards the object surface and a reference surface. The apparatus is adapted to obtain images of reflected linearly polarized light wave for a plurality of wavelengths. The images are obtained for at least four polarizations for each of the plurality of wavelengths. The reflected linearly polarized light wave is a reflection of the linearly polarized light wave directed towards the object surface and the reference surface. The apparatus is adapted to derive the topography of the object surface based on the obtained images.

Since the images are obtained for a plurality of wavelength, the deriving of the topography of the object surface is improved.

The embodiments herein afford many advantages, of which a non-exhaustive list of examples follows:

The embodiments herein are useful for determining surface geometrical topography over a large area. They are robust and fast with the accuracy of a single wavelength interferometer and the ambiguity of a wide-bandwidth white light interferometer. The working distance of the embodiments herein is long, 10-50 mm, which is much longer than for microscope objective systems used presently. The term accuracy used above may be explained as the degree to which the result of a measurement, calculation, or specification conforms to the correct value or to a standard.

The industrial use of the embodiments herein ranges from decision on process route and a method in polishing for automatic, medical and optical industrial tools, molds and products. Only 4× number of wavelengths images of a large part, in the example case discussed below 4×4 mm, of the surface area is required and it is therefore quick and much more insensitive to vibrations compared to single point measurements and interferometry instruments. The total surface area can then also be measured by stepping over the total area in steps of, in the exemplary case discussed below, 2-4 mm.

Some further advantages of the embodiments herein may be: The embodiments herein provides a long working distance since the apparatus can be placed 10-50 mm from the target area. With the embodiments herein, the topography of a large object surface can be simultaneously derived using a fast measurement. Another advantage may be that quantitative data over a large surface area is provided as feedback to the polishing process.

BRIEF DESCRIPTION OF THE DRAWINGS

Embodiments herein will now be described by way of example with reference to the accompanying drawings, of which:

FIG. 3b is a graph illustrating the power delay function as calculated from the spectrum in FIG. 3a.

FIG. 4b is a graph illustrating the resulting power delay function of the spectrum in FIG. 4a.

FIG. 5 is a schematic block diagram illustrating an object with an underlying surface and a transparent layer.

DETAILED DESCRIPTION

Figure 1:
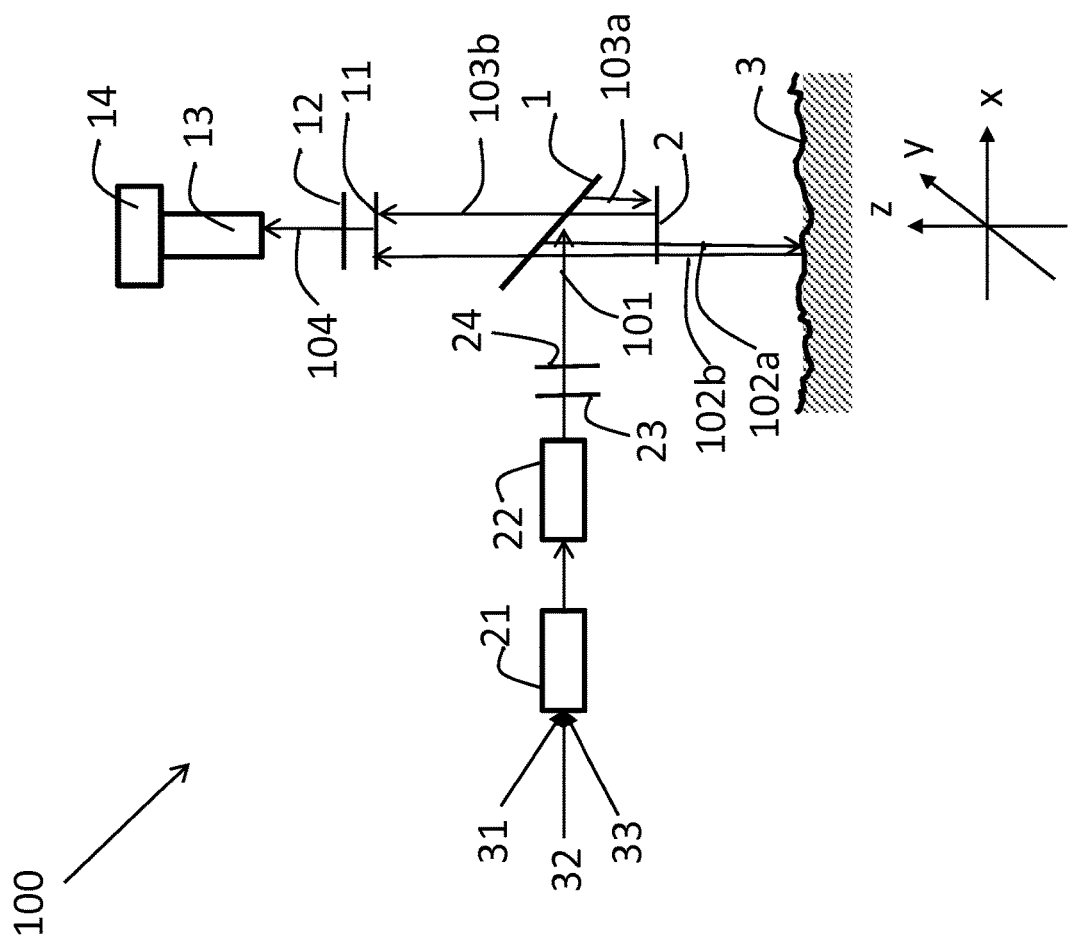
FIG. 1 is a schematic block diagram illustrating an apparatus.

FIG. 1 depicts an apparatus 100 according to some embodiments. The co-ordinate system used is shown with arrows at the bottom of FIG. 1. The x-axis is a horizontal axis along the paper from left to right, the y-axis is directed into the paper and the z-axis is a vertical axis along the paper from bottom to top.

The object which is under investigation comprises an object surface 3 which has a surface topography. The object surface 3 may also be referred to as surface. Topography refers to the three-dimensional arrangement of physical geometrical 3-dimensional attributes (such as shape, height, and depth) of the surface, i.e. the configuration of a surface including its relief features and the position of its features.

The object surface 3 is illuminated with laser light via fibers 31, 32, 33 from separate monochromatic light sources, i.e. creating a sinusoidal signal, (not shown in FIG. 1) of different color. The fibers 31, 32, 33 are connected to an optical fiber switch 21 which is adapted to switch between the fibers 31, 32, 33 to a collimator 22. The collimator 22 is adapted to produce a flat wave front, i.e. a wave front which has the same phase over a flat surface, which passes through two linear polarizing filters, i.e. a first linear polarizing filter 23 and a second linear polarizing filter 24. The first linear polarizing filter 23 is located after the collimator 22, and the second linear polarizing filter 24 is located after the first linear polarizing filter 23, i.e. the second linear polarizing filter 24 is located before a beam-splitter 1. The beam-splitter 1 will be described in more detail later. The flat wave front which is the output of the collimator 22 first goes through the first linear polarizing filter 23, and secondly through the second linear polarizing filter 24. The first linear polarizing filter 23 is adapted to attenuate the light intensity of the flat wave front coming from the collimator 22. The second linear polarizing filter 24 is adapted to transform the attenuated flat wave front coming from the first linear polarizing filter 23 into a linear polarized light wave 101 at a specific polarization angle Δ. The term light may be used when referring to a light wave.

The term polarization used above will now be briefly explained. A polarization is a property of waves that can oscillate with more than one orientation. In an electromagnetic wave, both the electric field and magnetic field are oscillating but in different directions. Light in the form of a plane wave propagates as a transverse wave, both the electric and magnetic fields are perpendicular to the wave's direction of travel. The oscillation of these fields may be in a single direction (linear polarization), or the field may rotate at the optical frequency (circular or elliptical polarization). In circular or elliptical polarization, the direction of the field's rotation, and thus the specified polarization, may be either clockwise or counter clockwise.

The beam-splitter 1 is a device which is adapted to direct the linear polarized light wave 101 (i.e. the output from the second linear polarizing filter 24) towards a reference surface 2 and to the object surface 3. The reference surface 2 is a reference to the path distance which surface reflected light wave 102b travels. The distance may also be referred to as delay. The beam-splitter 1 is positioned in an angle of 45° with respect to the linear polarized light wave 101 in order for a plane surface directed light wave 102a and the plane reference directed light wave 103a to hit the object surface 3 and the reference surface 2 in a plane manner. The reference surface 2 and the surface object 3 are parallel to each other. The surface directed light wave 102a and the reference directed light wave 103a are both linear polarized light waves.

The linear polarized light wave 101 directed towards the reference surface 2 is referred to as a reference directed light wave 103a and the linear polarized light wave 101 directed towards the object surface 3 may be referred to as surface directed light wave 102a.

The reference surface 2, which may be for example a wire-grid polarizer or any other suitable device, can therefore be described as a device which is adapted to transmit one linear polarization (i.e. the surface directed light wave 102a), polarized along the y-axis, and reflects the perpendicularly polarized component (i.e. the reference reflected light wave 103b), polarized along the x-axis. The reference reflected light wave 103b and the surface reflected light wave 102b may be referred to as linear polarized components.

The term wire-grid polarizer mentioned above will now be briefly explained. A polarizer may be described as an optical filter that passes light of a specific polarization and blocks waves of other polarizations. In addition, a polarizer can convert a light beam of undefined or mixed polarization into a beam with well-defined polarization, polarized light. A wire-grid polarizer is a type of polarizer which comprises a regular array of parallel conductive wires, placed in a plane perpendicular to the incident light beam. Electromagnetic waves which have a component of their electric fields aligned parallel to the wires induce the movement of electrons along the length of the wires. Electric filed components parallel to the wires are reflected, and electric field components which are perpendicular to the wires pass through the grid.

Returning to FIG. 1. The beam-splitter 1 is also adapted to let lights reflected from the reference surface 2 (this particular light is referred to as reference reflected light wave 103b herein) and the light reflected from the surface 3 (this particular reflected light is referred to as surface reflected light wave 102b herein) through towards an image capturing device 14 which is focused on the object surface 3 by e.g. an objective 13. The image capturing device 14 may be for example a camera such as a Charge Coupled Device (CCD) camera, a Complementary Metal Oxide Semiconductor (CMOS) camera or any other suitable type of image capturing device which is adapted to capture an image. The image capturing device 14 captures images for a plurality of wavelengths and for at least four polarizations. This means that there are four polarization pictures for each of the plurality of wavelengths (i.e. 4x the number of frequencies). The images may be captured in series or in parallel. The images may be taken for at least three wavelengths. The term wavelength and frequency may be used somehow interchangeably herein since a wavelength is the invers of a frequency.

The polarization angle Δ mentioned above is adjusted by the linear polarization filter 24 so that the reference reflected light wave 103b reflected from the reference surface 2 has substantially the same intensity as the surface reflected light wave 102b reflected from the object surface 3. In the following, the intensity of the surface reflected light wave 102b, reflected from the object surface 3, is denoted as $I_0$; while the intensity of the reference reflected light wave 103b, reflected form the reference surface 2, is denoted as $I_{90}$.

The two surface reflected light wave 102b and the reference reflected light wave 103b is combined to form an elliptical polarized light wave $I_W$ which passes through the beam-splitter 1 (this is the second time light passes through the beam-splitter 1) and goes through a quarter wave delay filter 11, which delays one linear polarization component at a 45° angle to the reference reflected light wave 103b and the surface reflected light wave 102b in regard to the perpendicular polarization component. After having passed through the quarter wave delay filter 11, the light then passes through a linear polarized filter 12 that can be rotated around the z-axis. The output of the linear polarized filter 12 may be referred to as the filtered linear polarized light wave 104. The filtered linear polarized light wave 104 is then captured as an image of the object surface 3 via an objective 13 by the image capturing device 14.

The linear polarized light wave 101 can be divided into components $E_y$ with amplitude A1, polarized along the x-axis and $E_x$ with amplitude A2, polarized along the y-axis, respectively. These will be reflected at the reference surface 2 as $$E_y = E1 \sin(\omega t)$$

where E1=A1, $\omega$ is $2\pi f$ where f is the frequency of the linear polarized light wave 101 and t is the reference time at the reference surface 2.

The surface reflected light wave 102b reflected at the object surface 3 is as follows:

$$E_x = E2 \sin(\omega t + \delta)$$

where $\omega$ is $2\pi f$, and where f is the frequency of the linear polarized light wave 101 and t is the reference time at the wire-grid. Where E2=A2 is the reflection co-efficient of the surface pixel at position x, y on the object surface 3 and $\delta$ is the phase difference between the two reflected signals, i.e. the surface reflected light wave 102b and the reference reflected light wave 103b. The phase difference can be written as:

$$\delta = \omega \cdot \Delta\tau = 2\pi \frac{2d}{\lambda}$$

where $\Delta\tau$ is the delay for the extra path way of the surface reflected light wave 102b as compared to the reference reflected light wave 103b; d is the distance between the reference surface 2 and the surface pixel x, y on the object surface 3; and $\lambda$ is the wavelength of the linear polarized light wave 101.

It is well known that the normalized Stokes parameters of an elliptical polarized signal combined from the surface reflected light wave 102b and the reference reflected light wave 103b can be written as:

$$s_0 = 1$$

$$s_1 = \frac{\langle E_1^2 \rangle - \langle E_2^2 \rangle}{\langle E_0^2 \rangle}$$

$$s_2 = \frac{2}{\langle E_0^2 \rangle} \cdot \langle E_1 \cdot E_2 \cdot \cos\delta \rangle$$

$$s_3 = \frac{2}{\langle E_0^2 \rangle} \cdot \langle E_1 \cdot E_2 \cdot \sin\delta \rangle$$

where $E_0^2 = E_1^2 + E_2^2$, and pointed parentheses represent expectation values over a certain time period.

It is also known from e.g. Cohen (Cohen, M. H.: "Radio Astronomy Polarization Measurements", Proc. IRE vol. 48, pp 172-183, January 1958) that these Stoke parameters may be calculated from the sum of difference of the various power responses. Let $W_0$, $W_{45}$, $W_{90}$ and $W_{135}$ be the power of the linear polarization vectors at angle 0, 45, 90 and 135 degrees to the x-axis. Also let $W_L$, and $W_R$ denote the power of the circular polarizations components Left circular and Right circular, respectively. Then the normalized Stoke parameters may be written as:

$$s_0 = \frac{W_0 + W_{90}}{W_0 + W_{90}} = 1$$

$$s_1 = \frac{W_0 - W_{90}}{W_0 + W_{90}}$$

$$s_2 = \frac{W_{45} - W_{135}}{W_0 + W_{90}}$$

$$s_3 = \frac{W_L - W_R}{W_0 + W_{90}}$$

Or as light intensities:

$$s_0 = \frac{I_0 + I_{90}}{I_0 + I_{90}} = 1$$

$$s_1 = \frac{I_0 - I_{90}}{I_0 + I_{90}}$$

$$s_2 = \frac{I_{45} - I_{135}}{I_0 + I_{90}}$$

$$s_3 = \frac{I_L - I_R}{I_0 + I_{90}}$$

Here $I_0$ and $I_{90}$ represent the intensities from a pixel at position (x,y) reflected from the reference surface 2 and the object surface 3, respectively. $I_{45}$ and $I_{135}$ represent the intensities of the combined signal $I_W$ as observed through polarization filters at 45° and 135°, respectively. $I_R$ and $I_L$, represent the same combined intensity as observed at Right Circular and Left Circular polarization, respectively.

The phase difference $\delta$ between the two wave components $E_x$ and $E_y$ of the linear polarized illuminating light wave 101 can now be determined as:

$$\delta = \arctan\left(\frac{s_3}{s_2}\right) = \arctan\left(\frac{I_L - I_R}{I_{45} - I_{135}}\right)$$

and $$d(x, y) = \frac{\lambda}{2} \cdot \frac{\delta}{2\pi}$$

d(x,y) is the distance between the reference surface 2 and the object surface 3 in position (x,y) along the z-axis. It is noted here that the measured phase has an ambiguity of $2\pi$, resulting in an ambiguity on distance of $$\frac{\lambda}{2}.$$

The four polarization intensities $I_{45}$, $I_{135}$, $I_R$ and $I_L$ may be measured in the way of the apparatus 100 shown in FIG. 1. The quarter wave delay filter 11 is positioned so that it will delay the linear polarization component at 45 degrees angle to the x-axis by 90 degrees of phase as compared to the component perpendicular to this. The linear polarization filter 12 will pass through a signal only along the polarization axis of the filter. The linear polarized filter 12 is rotated in four steps to angles 0, 45, 90 and 135 degrees. The images observed focused on the object surface 3 by the objective 13 are then recorded as the images of the polarization components $I_{45}$, $I_{135}$, $I_R$ and $I_L$, respectively. The path difference is then calculated for each pixel of the image separately. The path difference is calculated from the phase difference and is therefore subject to a $2\pi$ ambiguity, i.e. when the phase has turned a complete turn and the arctangent value measured as above has the same value as the phase minus the full turn.

Figure 2:
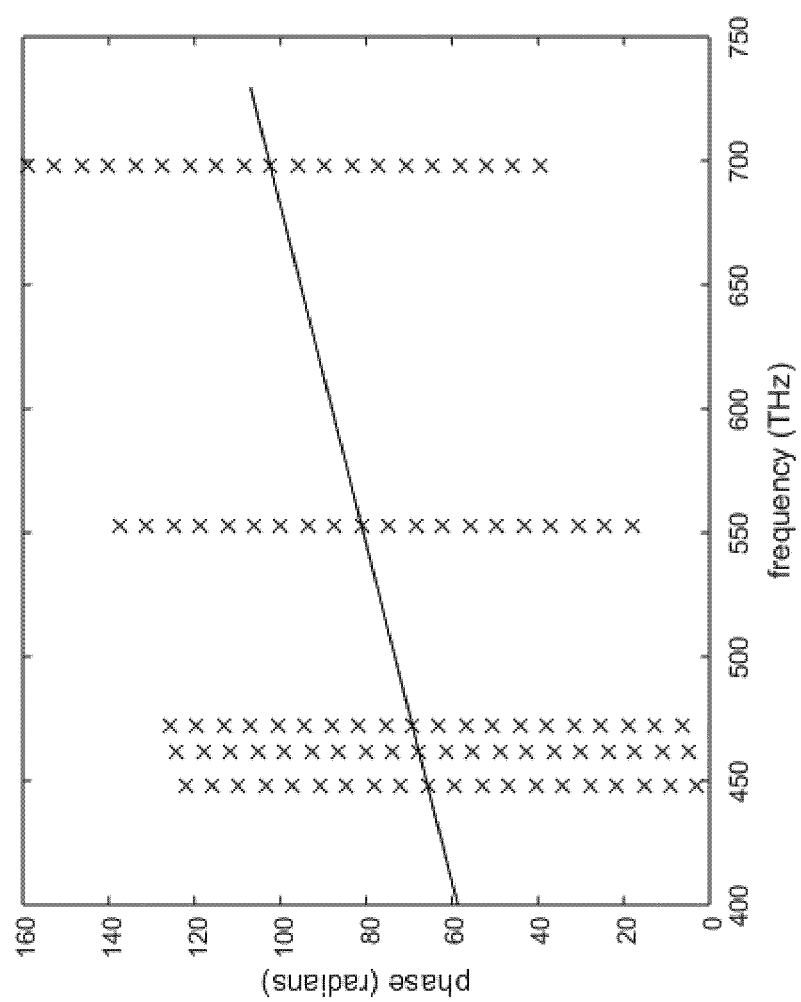
FIG. 2 is a graph illustrating phases and frequencies.

FIG. 2 is a graph where the x-axis of FIG. 2 represents the frequency measured in THz and the y-axis of FIG. 2 represents the phase measured in radians. The phase in FIG. 2 has a $2\pi$ ambiguity for each frequency and for a delay distance of 7 µm. The crosses represent the measured phases with multiple ambiguity phases. The line seen in FIG. 2 has this inclination through the phase points. The line through the data represents the true delay distance of 7 µm. The slope of the line is:

$$\frac{\Delta \delta}{\Delta v} = \tau = \frac{d}{c}$$

where $c$ is the speed of light and $d = 7$ µm

The measured phase difference can also be written as:

$$\delta = 2\pi v_1 \tau$$

where $v_1$ is the frequency and $\tau$ is the delay of the signal going from the reference surface 2 to the object surface 3 and back. This is a measured quantity and we now can "observe" this with a synthetic instrument. A synthetic instrument is an instrument that does not exist physically, but is formed in a computer by the analysis of data from one or several physical instruments. The surface reflected light wave 102b will arrive at the reference position, the reference surface 2, at time t as $V(v, t)$. The signal directly reflected at the reference surface 2 will at this time be the retarded wave $V(v, t+\tau)$. The interference of these waves is:

$$S(v,\tau) = \langle V^*(v,t) \cdot V(v,t+\tau) \rangle$$

This is the cross-correlation function of the signal reflected at the reference surface 2 and the object surface 3 at the time when they both arrive at the reference surface. The delay function can now be written as:

$$S(\tau) = F(I(v))$$

where F denotes the Fourier transform of the intensity frequency spectrum I and $v$ is the frequency. The delay function S is in the following denoted as the "delay beam" produced by the intensity frequency spectrum I with bandwidth $\Delta v$. The delay beam is the time response of the spectrum. For a single spectral line $v_0$ the delay beam will have side lobes of equal strength to the main lobes at $2\pi$, as the ambiguity observed above. A larger bandwidth will increase the width of the main lobe and decrease the level of the side lobes. A very large bandwidth will make the side lobes disappear. This latter is the case when a White Light Interferometer is used to scan the delay beam.

In a White Light Interferometer the light is reflected against an object surface, $V_{obj}$, and again against a reference surface, $V_{ref}$. Each signal is delayed from a reference position as $\tau_{obj}$ and $\tau_{ref}$, respectively. The two signals can be written as:

$$V_{obj} = e^{-2\pi i v(t+\tau_{obj})}$$

$$V_{ref} = e^{-2\pi i v(t+\tau_{ref})}$$

The observed intensity of the combined signal is registered as:

$$I = \langle (V_{obj} + V_{ref}) \cdot (V_{obj} + V_{ref})^* \rangle$$
$$= \langle V_{obj} V_{obj}^* \rangle + \langle V_{ref} V_{ref}^* \rangle + \langle V_{ref} V_{obj}^* \rangle + \langle V_{obj} V_{ref}^* \rangle$$
$$= I_{obj} + I_{ref} + \langle V_{ref} V_{obj}^* \rangle + \langle V_{obj} V_{ref}^* \rangle$$

$$\langle V_{obj} V_{ref}^* \rangle = e^{-2\pi i v(\tau_{obj} - \tau_{ref})}$$

and $$I = I_{obj} + I_{ref} + 2 \cdot \sqrt{I_{obj} I_{ref}} \cos(2\pi(\tau_{obj} - \tau_{ref}))$$

where I is the intensity image. Note that the registered image is the sum of the image of the object $I_{obj}$, the image of the reference $I_{ref}$, and the third interference terms. The interference intensity can be both negative, destructive interference, and positive, constructive interference.

Note that the two other interference terms differ only by the sign of the phase. The intensity observed at any specific pixel in the image will then change by moving either the object, changing $\tau_{obj}$, or the reference, $\tau_{ref}$. The relative distance between the object and reference is then scanned to find the maximum intensity where the two delays are equal.

The embodiments herein obtain the interference term directly, without the disturbance of the two images of object and reference, respectively. The reference and interference signals are created analytically in the computer since the phase of the object signal is already known. $V_{obj}$ is calculated from the observed phase $\delta$ as:

$$V_{obj} = e^{-i\delta}$$

and $V_{ref}$ is calculated as:

$$V_{ref} = e^{-2\pi i v\tau}$$

where $\tau$ is the delay inserted into the reference and $v$ is the frequency.

The embodiments herein can observe the phase difference $\delta$ at a variety of wavelengths. These wavelengths then span a larger bandwidth and the observed delay, or interference term, function is reduced to:

$$S(\tau) = \sum_{k=1}^{K} V_k \cdot V_{k,ref}^*$$

$$V_k = e^{-i(\sigma_k - \sigma_{k \cdot ref})}$$

$V_k$ is the object signal at /wavelength/frequency k, and $\sigma_k$ is the phase measured at the pixel at frequency k and $\sigma_{k,ref}$ is the phase measured in the reference pixel a frequency k. $V_{k,ref}$ is calculated as:

$$V_{k,ref} = e^{-2\pi i v_k \tau}$$

where $\tau$ is the delay inserted into the reference. The delay function is then the Fourier transform from frequency space to delay space of the construed complex voltages $V_k$ calculated from the observed phases at each frequencies.

The maximum amplitude of this delay function is at the delay where all frequency data are coherently added as positive interference, i.e. the position of the object surface 3. Thus, the ambiguity can be reduced to longer intervals if frequencies are chosen so that the side lobes of the delay beam are reduced. The number of required frequencies can be very much reduced by choosing the frequencies so that the difference between frequencies is non-redundant.

The delay to the object surface 3 may be long, depending on the physical distance between the reference surface 2 and the object surface 3, and this delay, or distance, can be longer than the ambiguity distance. The reference position may be shifted in the synthetic instrument by subtracting a known delay $\tau_0$. Since the actual distance between the reference surface 2 and object surface 3 is of no consequence for the surface data, the reference may so be shifted to a position at the object surface 3. The phase at the reference position will be zero for all frequencies, since the delay is zero. Therefore it is possible to choose a position at the object surface 3, say the center co-ordinate ($x_0$, $y_0$), store the measured phase at each frequency as measured there and subtract each of those phases from phases measured at all other positions at the same frequencies. The delay of all other positions at the object surface 3 will then be referenced to the z-position of the center pixel. This calibration also removes any possible motion in the z-direction between the measurements of the various frequencies.

It is also noted that the above analysis also is correct if the observed phase is the combination of several reflections or delays. In this case the observed delay function will have separate peaks for each reflection and a multitude of layers can be so observed, detected and measured.

Figure 3A:
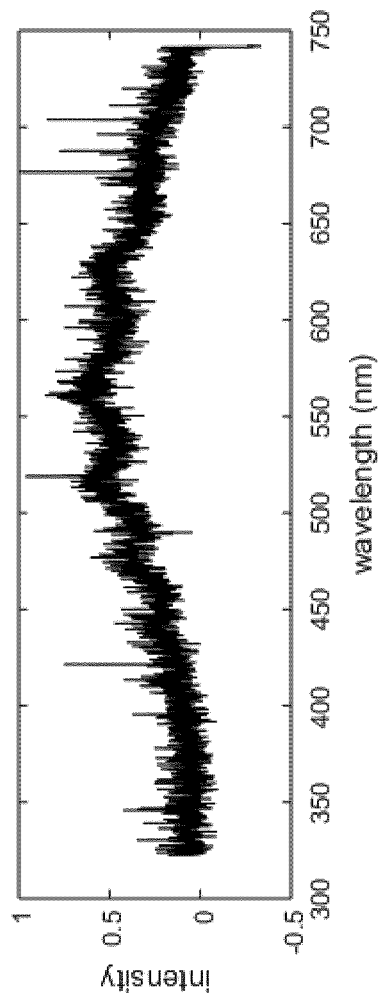
FIG. 3a is a graph illustrating the intensity spectrum emitted from the light source of a white light interferometer.
Figure 3B:
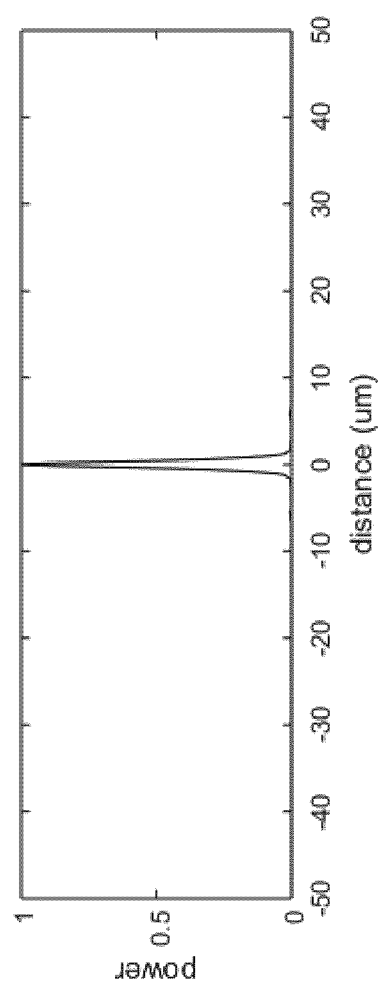

FIG. 3a illustrates the intensity spectrum emitted from the lamp of a white light interferometer. The x-axis of FIG. 3a represents the wavelength measured in nanometer (nm) and the y-axis of FIG. 3a represents the intensity measured at each frequency measured in arbitrary power units. FIG. 3b illustrates the power delay function as calculated from that spectrum. The x-axis of FIG. 3b represents the distance measured in μm and the y-axis represents the power measured in arbitrary power units. The peak of the power delay function is at the reference position 0.

Figure 4A:
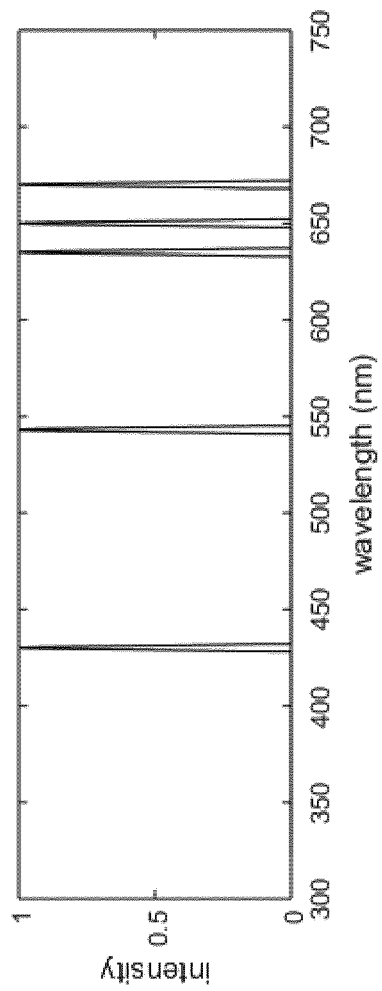
FIG. 4a is a graph illustrating the intensity spectrum of five spectral lines at 430, 543, 635, 650, and 670 nm.
Figure 4B:
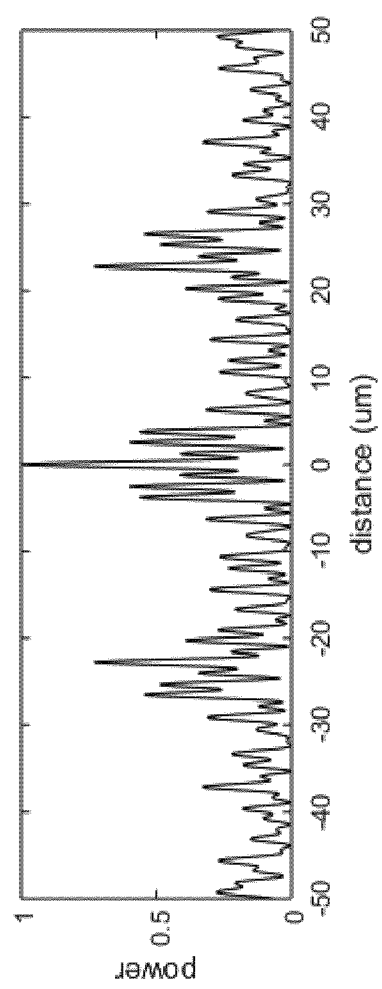

FIG. 4a illustrates the intensity spectrum of five spectral lines at 430, 543, 635, 650, and 670 nm. The x-axis of FIG. 4a represents the wavelength measured in nm and the y-axis of FIG. 4a represents the intensity measured over each frequency and combined to form a full spectrum. FIG. 4b illustrates the resulting power delay function in view of the intensity spectrum in FIG. 4a. The x-axis of FIG. 4b represents the distance measured in μm and the y-axis represents the power measured in arbitrary units. The major power peak of the delay function in FIG. 4b is at the reference position 0.

In some embodiment, an upper layer 202 located above of the object surface 3. This is illustrated in FIG. 5. The upper layer 202 may have an irregular surface or it may be a substantially plane surface. The upper layer 202 is comprised of a semi-transparent material with index of refraction n. The terms semi-transparent and substantially transparent may be used interchangeably herein. The reflected signal is then the sum of the signals reflected from surface of the semi-transparent upper layer 202 and the object surface 3 and can then be written as:

$$V_k = e^{-i(\sigma_{k,3} - \sigma_{k,ef})} + e^{-i(\sigma_{k,202} - \sigma_{k,ef})}$$

and $$\delta_{k,3} = 2\pi \nu_k (\tau_{202} + n \cdot (\tau_3 - \tau_{202}))$$

where $\tau_{202}$ is the delay between the reference surface and the surface of the upper layer 202, n is the index of refraction of the upper layer 202, $\sigma_{k,3}$ is the phase to the object surface 3 at frequency k, $\sigma_{ref}$ is the phase offset to the reference position at the reference surface (the reference surface could be either be the object surface 3 or the surface of the upper layer 202), $\sigma_{k,202}$ is the phase to the surface of the upper layer 202, $\tau_3$ is geometrical delay from the reference surface to the object surface 3, k is frequency number, $\nu$ is the frequency and n is the index of refraction for the semitransparent material of the upper layer 202. The corresponding delay function then becomes the sum of the two delay function for the two reflections at the object surface 3 and the upper layer 202. The reflection coming from the object surface 3 has a longer path distance compared to the reflection from the surface of the semi-transparent upper layer 202. This is because the reflection from the object surface 3 travels a longer geometrical distance and because it goes through a semi-transparent material where the speed of light is lower. Thus the two reflection layers can be separated and both be determined.

Considering an example where the object comprising an object surface 3 to be polished is a tool. The tool surface 3 is being polished by a machine or a human. The polishing process requires measurements of the surface area representing the surface roughness in order to be able to determine the way to proceed with the polishing process in order to reach a predefined smoothness. In this example, the target is studied in blocks of 4×4 mm with 2048×2048 pixels at focal resolution of 2 μm.

Images of the 4×4 mm surface area on the target surface are recorded with a CCD camera representing the image capturing device 14 in FIG. 1 with 2048×2048 gray scale pixels. The intensity in image pixel position (m,n) at the tool surface 3 is $I_k$(m,n) is recorded at the frequency k, where m is a position on the x-axis and n is a position on the y-axis. Four images are taken in the four polarizations 45°, 135° and Left and Right Circular Polarization at each frequency k from 1 to K as $$I_{k,45}(m,n), I_{k,135}(m,n), I_{k,L}(m,n), I_{k,R}(m,n),$$

where K is a positive integer.

The phase for each pixel is calculated at each frequency k, switched by the optical fiber switch 21 as discussed above as $$\delta_k(m,n)$$

One pixel $m_0$, $n_0$ is designed as reference and the relative complex voltage for each pixel and each frequency is calculated as $$V_k(m,n) = e^{-i2\pi(\delta_k(m,n) - \delta_k(m_0,n_0))}$$

This is then Fourier transformed over all frequencies as discussed above and the position of maximum power in the delay function is determined as distance to be $d_{max}$(m,n). One frequency, with wavelength $\lambda_k$ is chosen and the phase ambiguity is calculated as $$N(m,n) = \text{integer}\left(\frac{d_{max}(m,n)}{\lambda_k}\right)$$

The z-offset of the pixel m, n relative the zero-position $m_0$, $n_0$ is then calculated as:

$$d(m,n) = (\delta_k(m,n) + N(m,n) \ast \lambda_k)/2$$

This calculated offset has the resolution defined by the phase for a single frequency and the ambiguity defined by the assembly of frequencies. i.e. the resolution of the ambiguity of a white light interferometer and the resolution of phase, or in other words small portion of a wavelength.

The method for deriving topography of an object surface 3 will now be described with reference to FIG. 6. The method comprises at least some of the following steps, which steps may be performed in any suitable order than described below:

Step 601

A linearly polarized light wave 102a, 103a is directed towards the object surface 3 and a reference surface 2.

A semi-transparent surface 202 may be located above the object surface 3. The linearly polarized light wave 102a, 103a may be directed towards both the object surface 3, a semi-transparent surface 202 located above the object surface 3 and the reference surface 2.

The linearly polarized light wave 102a, 103a may be directed perpendicularly or at an angle less than 6 degrees towards the object surface 3.

The reference surface 2 may be a wire grid polarizer.

Step 602

Images of reflected linearly polarized light wave 102b, 103b for a plurality of wavelengths is obtained. The images are obtained for at least four polarizations for each of the plurality of wavelengths. The reflected linearly polarized light wave 102b, 103b is a reflection of the linearly polarized light wave 102a, 103a directed towards the object surface 3 and the reference surface 2.

The image may be obtained in at least four polarizations by that the linearly polarized light wave 102a, 103a passes through a quarter wave filter 11 and a linear polarization filter 12.

The at least four polarizations may be 45°, 135°, left circular polarization and right circular polarization.

The reflected linearly polarized light wave 102b, 103b may be a reflection of the linearly polarized light wave 102a, 103a directed towards both the object surface 3, a semi-transparent surface 202 located above the object surface 3 and the reference surface 2.

Step 603

The topography of the object surface 3 is derived based on the obtained images.

Step 603a

This is an optional step. This step may be seen as a substep of step 603. Light intensity images for each of the at least four polarizations for each of the plurality of wavelengths may be obtained.

Step 603b

This is an optional step. This step may be seen as a substep of step 603 and a substep which may be performed after step 603a. Based on the obtained light intensity images, a phase difference between the surface reflected light wave 102b and the reference reflected light wave 103b for each of the plurality of wavelengths may be obtained.

The phase difference may be referred to with the letter δ and may be obtained using any of the suitable equations described earlier, such as e.g.

$$\delta = \omega \cdot \Delta\tau = 2\pi \frac{2d}{\lambda}, \text{ or}$$

$$\delta = \arctan\left(\frac{s_3}{s_2}\right) = \arctan\left(\frac{I_L - I_R}{I_{45} - I_{135}}\right), \text{ or}$$

$$\delta = 2\pi v_1 \tau$$

Step 603c

This is an optional step. This step may be seen as a substep of step 603 and a substep which may be performed after steps 603a and 603b. A distance between a reference surface 2 and the surface 3 based on the obtained phase differences. The distance in a position x, y may be denoted d and may be obtained for example by using any of the suitable equations mentioned earlier, such as e.g. the following equation:

$$d(x, y) = \frac{\lambda}{2} \cdot \frac{\delta}{2\pi}$$

The reflected linearly polarized light wave 102b, 103b may comprise surface reflected light wave 102b and reference reflected light wave 103b. The reference reflected light wave 103b may be a perpendicularly linearly polarized light wave which has been reflected at a reference surface 2.

The reference reflected light wave 103b may be at a reference position on the reference surface 2, and the reference position may be shifted by subtracting a delay for each of the plurality of wavelengths. By changing the reference to a position on the reference surface, a calibration between the frequencies (i.e. wavelengths) is achieved.

The phase for each frequency (i.e. each wavelength) is measured. By combining the measured phase data, the distance/delay is obtained.

Figure 6:
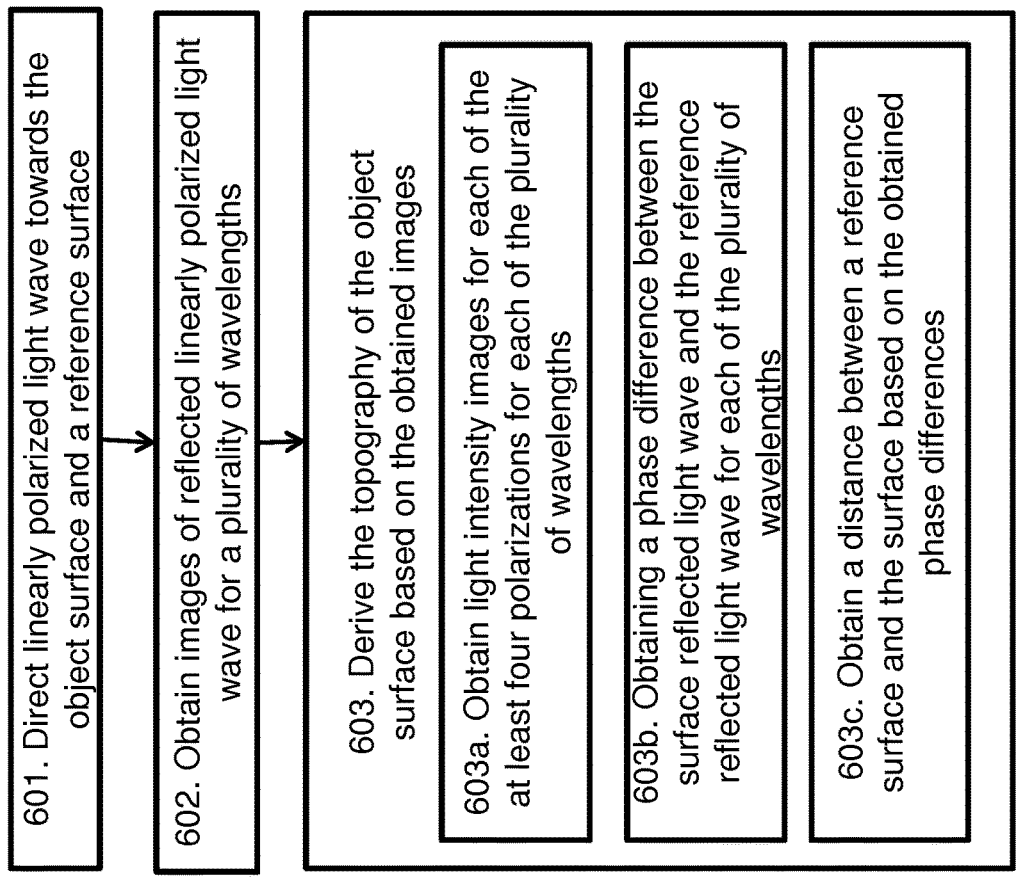
FIG. 6 is a flow chart illustrating embodiments of a method.
Figure 7:
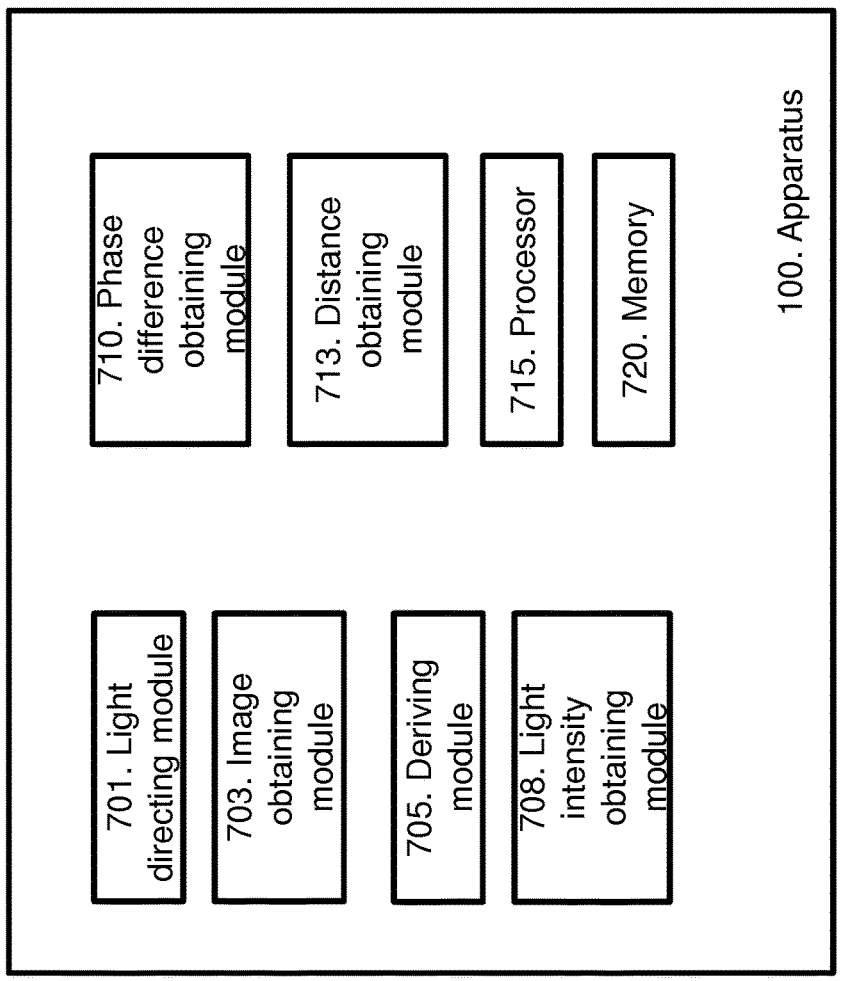
FIG. 7 is a schematic block diagram illustrating embodiments of an apparatus.

To perform the method steps shown in FIG. 6 deriving topography of an object surface 3 the apparatus 100 may comprise an arrangement as shown in FIG. 7. The arrangement comprises at least some of the modules illustrated in FIG. 7, but may also comprise additional modules.

To perform the method steps shown in FIG. 6 for deriving a topography of an object surface 3, the apparatus 100 is adapted to, e.g. by means of a light directing module 701, direct linearly polarized light wave 102a, 103a towards the object surface 3 and a reference surface 2. The light directing module 701 may be the beam splitter 1 illustrated in FIG. 1. As mentioned above, the reference surface 2 may be a wire grid polarizer. The light directing module 701 may also be referred to as a light directing unit, a light directing means, a light directing circuit, means for directing light, etc.

The apparatus 100 is further adapted to, e.g. by means of an image obtaining module 703, obtain images of reflected linearly polarized light wave 102b, 103b for a plurality of wavelengths. The images are obtained for at least four polarizations for each of the plurality of wavelengths. The reflected linearly polarized light wave 102b, 103b is a reflection of the linearly polarized light wave 102a, 103a directed towards the object surface 3 and the reference surface 2. The image obtaining module 703 may be the image capturing device 14 in FIG. 1. The plurality of wavelengths may comprise at least three wavelengths.

The at least four polarizations may be 45°, 135°, left circular polarization and right circular polarization.

The reflected linearly polarized light wave 102b, 103b may be a reflection of the linearly polarized light wave 102a, 103a directed towards both the object surface 3, a semi-transparent surface 202 located above the object surface 3 and the reference surface 2.

The image obtaining module 703 may also be referred to as an image obtaining unit, an image obtaining means, an image obtaining circuit, means for obtaining images, etc.

The apparatus 100 is further adapted to, e.g. by means of a deriving module 705, derive the topography of the object surface 3 based on the obtained images. The deriving module 705 may also be referred to as a deriving unit, a deriving means, a deriving circuit, means for deriving, etc.

The reflected linearly polarized light wave 102b, 103b may comprise surface reflected light wave 102b and reference reflected light wave 103b. The reference reflected light wave 103b may be a perpendicularly linearly polarized light wave which has been reflected at a reference surface 2.

The reference reflected light wave 103b may be at a reference position on the reference surface 2, and the reference position may be shifted by subtracting a delay for each of the plurality of wavelengths.

The apparatus 100 may be further adapted to, e.g. by means of a light intensity obtaining module 708, obtain light intensity images for each of the at least four polarizations for each of the plurality of wavelengths. The light intensity obtaining module 708 may also be referred to as a light intensity obtaining unit, a light intensity obtaining means, a light intensity obtaining circuit, means for obtaining light intensity, etc.

The apparatus 100 may be further adapted to, e.g. by means of a phase difference obtaining module 710, based on the obtained light intensity images, obtain a phase difference between the surface reflected light wave 102b and the reference reflected light wave 103b for each of the plurality of wavelengths. The phase difference obtaining module 710 may also be referred to as a phase difference obtaining unit, a phase difference obtaining means, a phase difference obtaining circuit, means for obtaining phase difference, etc.

The apparatus 100 may be further adapted to, e.g. by means of a distance obtaining module 713, obtain a distance between a reference surface 2 and the surface 3 based on the obtained phase differences. The distance obtaining module 713 may also be referred to as a distance obtaining unit, a distance obtaining means, a distance obtaining circuit, means for obtaining distance, etc.

The apparatus 100 may be adapted to, e.g. by means of the image obtaining module 703, obtain the images in at least four polarizations by that the linearly polarized light wave 102a, 103a passes through a quarter wave filter 11 and a linear polarization filter 12.

A semi-transparent surface 202 may be located above the object surface 3.

The apparatus 100 may be adapted to, e.g. by means of the light directing module 701, direct the linearly polarized light wave 102a, 103a towards both the object surface 3, a semi-transparent surface 202 located above the object surface 3 and the reference surface 2.

The apparatus 100 may be adapted to, e.g. by means of the light directing module 701, direct the linearly polarized light wave 102a, 103a perpendicularly or at an angle less than 6 degrees towards the object surface 3.

The arrangement 100 may comprise a processor 715 and a memory 720. The memory 720 comprises instructions executable by the processor 715.

The memory 720 may comprise one or more memory units. The memory 720 is arranged to be used to light intensity data, wavelength data, frequency information, light wave reflection data, light wave data, polarization data, topography data, images in order to perform the methods herein when being executed in the apparatus 100.

A computer program may comprise instructions which, when executed on at least one processor, cause the at least one processor to carry out the method according to FIG. 6. A carrier may comprise the computer program, and the carrier may be one of an electronic signal, optical signal, radio signal or computer readable storage medium.

Summarized, the embodiments herein provide a method and a device for quantitative measurements of surface quality during polishing processes. The embodiments herein relate to a method for optical quantitative measurement of surface topography of an area. In more detail, the embodiments herein relates to a method and apparatus for determining the topography of a surface as well as an underlying surface if the first surface is at least semi-transparent. A beam of parallel and linearly polarized monochromatic light is sent perpendicularly towards the object surface 3. The topography of the object surface 3 is then measured by observing the polarized reflected light at four polarizations and over several wavelengths.

In-situ optical quantitative measurement of surface accuracy of an area during polishing process is obtained by directing a monochromatic flat light wave towards a predefined surface area, recording an image of the reflected light with a camera and lens system focused on said surface area and deducing surface accuracy parameters from the recorded image.

The embodiments herein have been verified and tested for the cases where the focus pixel area is less than 100 wavelengths in diameter. These are not theoretical limitations but rather practical due to present limits on number of pixels of the image capturing device 14.

Although the embodiments herein have been described with reference to various embodiments, those skilled in the art will recognise that changes may be made without departing from the scope of the embodiments herein. It is intended that the detailed description be regarded as illustrative and that the appended claims including all the equivalents are intended to define the scope of the embodiments herein.

The invention claimed is:

1. A method for deriving topography of an object surface, the method comprising:

directing a linearly polarized light wave towards the object surface along a z-direction and a reference surface, wherein the linearly polarized light wave is from light sources and has passed through linear polarizing filters, wherein the linear polarized light wave directed towards the reference surface is a reference directed light wave and the linear polarized light wave directed towards the object surface is a surface directed light wave;

obtaining images of a reflection of the linearly polarized light wave directed towards the object surface and the reference surface for a plurality of wavelengths, wherein the images are obtained for at least four polarizations for each of the plurality of wavelengths, wherein the reflection of the linearly polarized light wave comprises a surface reflected light wave and a reference reflected light wave; and deriving the topography of the object surface based on the obtained images, wherein a delay between the surface reflected light wave and the reference reflected light wave is dependent on a physical distance between the reference surface and the object surface;

wherein a synthetic instrument that does not exist physically is formed in a computer, wherein a reference z-position, equivalent to the z-position of a synthetic reference surface, is shifted, using the synthetic instrument, to a z-position at the object surface by subtracting a known delay, such that a remaining delay is zero and a phase at the reference z-position is zero for all wavelengths;

wherein the method further comprises:

choosing a x-y-position at the object surface;

storing a measured phase at each wavelength as measured at the chosen x-y-position; and subtracting each of the measured phases at the chosen x-y-position from phases measured at all other x-y-positions at the same wavelengths, and wherein the delay of all other x-y-positions at the object surface is referenced to the z-position of the chosen x-y-position.

2. The method according to claim 1, wherein the plurality of wavelengths comprises at least three wavelengths.

3. The method according to claim 1, wherein the reference reflected light wave is a perpendicularly linearly polarized light wave which has been reflected at a reference surface, wherein the surface reflected light wave is polarized along an y-axis, and the perpendicularly polarized reference reflected light wave is polarized along a x-axis, and
wherein the deriving the topography of the object surface based on the obtained images further comprises:
obtaining light intensity images for each of the at least four polarizations for each of the plurality of wavelengths;
based on the obtained light intensity images, obtaining a phase difference between the surface reflected light wave and the reference reflected light wave for each of the plurality of wavelengths; and
obtaining a distance between a reference surface and the surface based on the obtained phase differences.

4. The method according to claim 1, wherein the images are obtained in at least four polarizations by that the surface reflected light wave and the reference reflected light wave passes through a quarter wave filter and a linear polarization filter.

5. The method according to claim 1, wherein the at least four polarizations are 45°, 135°, left circular polarization and right circular polarization.

6. The method according to claim 1, wherein a semi-transparent surface is located above the object surface in a vertical z-direction.

7. The method according to claim 1, wherein the linearly polarized light wave is directed towards both the object surface, a semi-transparent surface located above the object surface and the reference surface, wherein the linearly polarized light wave hit the object surface, the reference surface and the semi-transparent surface in a plane manner, and wherein the reference surface and the object surface are parallel to each other.

8. The method according to claim 1, wherein the reflection of the linearly polarized light wave is directed towards both the object surface, a semi-transparent surface located above the object surface and the reference surface.

9. The method according to claim 1, wherein the linearly polarized light wave is directed perpendicularly or at an angle less than 6 degrees towards the object surface.

10. The method according to claim 1, wherein the reference surface is a wire grid polarizer.

11. An apparatus for deriving topography of an object surface, wherein the apparatus comprises:
light sources;
linear polarizing filters;
a light directing module adapted to direct a linearly polarized light wave towards the object surface along a z-direction and a reference surface, wherein the linear polarized light wave is from the light sources and has passed through the linear polarizing filters, wherein the linear polarized light wave directed towards the reference surface is a reference directed light wave and the linear polarized light wave directed towards the object surface is a surface directed light wave;
an image obtaining module adapted to obtain images of a reflection of the linearly polarized light wave directed towards the object surface and the reference surface for a plurality of wavelengths, wherein the images are obtained for at least four polarizations for each of the plurality of wavelengths, wherein the reflection of the linearly polarized light wave comprises a surface reflected light wave and a reference reflected light wave, wherein a delay between the surface reflected light wave and the reference reflected light wave is dependent on a physical distance between the reference surface and the object surface;
a deriving module adapted to derive the topography of the object surface based on the obtained images;
a computer in which a synthetic instrument that does not exist physically is formed to shift a reference z-position, equivalent to the z-position of a synthetic reference surface, to a z-position at the object surface by subtracting a known delay, such that the remaining delay is zero and a phase at the reference z-position is zero for all wavelengths, wherein the computer is configured to:
choose a x-y-position at the object surface;
store a measured phase at each wavelength as measured at the chosen x-y-position; and
subtract each of the measured phases at the chosen x-y-position from phases measured at all other x-y-positions at the same wavelengths,
wherein the delay of all other x-y-positions at the object surface is referenced to the z-position of the chosen x-y-position.

12. The apparatus according to claim 11, wherein the plurality of wavelengths comprises at least three wavelengths.

13. The apparatus according to claim 11, wherein the reference reflected light wave is a perpendicularly linearly polarized light wave which has been reflected at a reference surface, wherein the surface reflected light wave is polarized along an y-axis, and the perpendicularly polarized reference reflected light wave is polarized along a x-axis, and
wherein the apparatus further comprises:
a light intensity obtaining module, adapted to obtain light intensity images for each of the at least four polarizations for each of the plurality of wavelengths;
a phase difference obtaining module, adapted to obtain a phase difference between the surface reflected light wave and the reference reflected light wave for each of the plurality of wavelengths, based on the obtained light intensity images; and
a distance obtaining module adapted to obtain a distance between a reference surface and the surface based on the obtained phase differences.

14. The apparatus according to claim 11, wherein the apparatus is adapted to obtain the images in at least four polarizations by that the surface reflected light wave and the reference reflected light wave passes through a quarter wave filter and a linear polarization filter comprised in the apparatus.

15. The apparatus according to claim 11, wherein the at least four polarizations are 45°, 135°, left circular polarization and right circular polarization.

16. The apparatus according to claim 11, wherein a semi-transparent surface is located above the object surface in a vertical z-direction and wherein the semi-transparent surface is an upper layer of the object surface.

17. The apparatus according to claim 11, wherein the apparatus is adapted to direct the linearly polarized light wave towards both the object surface, a semi-transparent surface located above the object surface and the reference surface, wherein the linearly polarized light wave hit the object surface, the reference surface and the semi-transparent surface in a plane manner, wherein the reference surface and the object surface are parallel to each other and wherein the reference surface is comprised in the apparatus.

18. The apparatus according to claim 11, wherein the reflection of the linearly polarized light wave directed towards both the object surface, a semi-transparent surface located above the object surface and the reference surface.

19. The apparatus according to claim 11, wherein the apparatus is adapted to direct the linearly polarized light wave perpendicularly or at an angle less than 6 degrees towards the object surface.

20. The apparatus according to claim 11, wherein the reference surface is a wire grid polarizer.

* * * * *